United States Patent
Berlin

(10) Patent No.: US 10,972,495 B2
(45) Date of Patent: Apr. 6, 2021

(54) METHODS AND APPARATUS FOR DETECTING AND IDENTIFYING MALWARE BY MAPPING FEATURE DATA INTO A SEMANTIC SPACE

(71) Applicant: Invincea, Inc., Fairfax, VA (US)

(72) Inventor: Konstantin Berlin, Potomac, MD (US)

(73) Assignee: Invincea, Inc., Reston, VA (US)

(*) Notice: Subject to any disclaimer, the term of this patent is extended or adjusted under 35 U.S.C. 154(b) by 393 days.

(21) Appl. No.: 15/666,859

(22) Filed: Aug. 2, 2017

(65) Prior Publication Data

US 2018/0041536 A1 Feb. 8, 2018

Related U.S. Application Data

(60) Provisional application No. 62/369,984, filed on Aug. 2, 2016.

(51) Int. Cl.
| | |
|---|---|
| G06F 21/56 | (2013.01) |
| H04L 29/06 | (2006.01) |
| G06N 3/04 | (2006.01) |
| G06N 3/08 | (2006.01) |

(52) U.S. Cl.
CPC .......... H04L 63/1433 (2013.01); G06F 21/56 (2013.01); G06N 3/04 (2013.01);
(Continued)

(58) Field of Classification Search
CPC . G06N 3/08; G06N 3/04; G06N 7/005; G06F 17/11; G06F 21/56; H04L 63/1433; H04L 63/1416; H04L 63/145
See application file for complete search history.

(56) References Cited

U.S. PATENT DOCUMENTS

| | | |
|---|---|---|
| 6,226,629 B1 | 5/2001 | Cossock |
| 8,001,583 B2 | 8/2011 | Waizumi et al. |

(Continued)

FOREIGN PATENT DOCUMENTS

| | | |
|---|---|---|
| EP | 3018879 | 5/2015 |
| WO | WO 2017/011702 | 1/2017 |
| WO | WO 2017/223294 | 12/2017 |

OTHER PUBLICATIONS

Luo (2014). Deep Learning With Noise. Retrieved Oct. 15, 2019 from https://pdfs.semanticscholar.org/d79b/a428e1cf1b8aa5d320a93166315bb30b4765.pdf (Year: 2014).*

(Continued)

*Primary Examiner* — Brian F Shaw
(74) *Attorney, Agent, or Firm* — Cooley LLP

(57) ABSTRACT

In some embodiments, an apparatus includes a memory and a processor operatively coupled to the memory. The processor is configured to identify a feature vector for a potentially malicious file and provide the feature vector as an input to a trained neural network autoencoder to produce a modified feature vector. The processor is configured to generate an output vector by introducing Gaussian noise into the modified feature vector to ensure a Gaussian distribution for the output vector within a set of modified feature vectors. The processor is configured to provide the output vector as an input to a trained neural network decoder associated with the trained neural network autoencoder to produce an identifier of a class associated with the set of modified feature vectors. The processor is configured to perform a remedial action on the potentially malicious file based on the potentially malicious file being associated with the class.

14 Claims, 10 Drawing Sheets

(52) U.S. Cl.
CPC .............. *G06N 3/0454* (2013.01); *G06N 3/08* (2013.01); *H04L 63/145* (2013.01); *H04L 63/1416* (2013.01)

(56) References Cited

U.S. PATENT DOCUMENTS

| | | | |
|---|---|---|---|
| 8,028,338 | B1 | 9/2011 | Schneider et al. |
| 8,095,981 | B2 | 1/2012 | Rabinovitch et al. |
| 8,291,497 | B1 | 10/2012 | Griffin et al. |
| 8,413,244 | B1* | 4/2013 | Nachenberg .......... H04L 63/145 713/188 |
| 8,505,094 | B1 | 8/2013 | Xuewen et al. |
| 8,521,667 | B2 | 8/2013 | Zhu et al. |
| 9,015,814 | B1 | 4/2015 | Zakorzhevsky et al. |
| 9,672,358 | B1 | 6/2017 | Long et al. |
| 9,690,938 | B1 | 6/2017 | Saxe et al. |
| 9,705,904 | B1 | 7/2017 | Davis et al. |
| 9,910,986 | B1 | 3/2018 | Saxe et al. |
| 9,940,459 | B1 | 4/2018 | Saxe |
| 10,104,100 | B1 | 10/2018 | Bogorad |
| 10,303,875 | B1 | 5/2019 | Saxe et al. |
| 10,318,735 | B2 | 6/2019 | Saxe |
| 10,474,818 | B1 | 11/2019 | Saxe |
| 10,649,970 | B1 | 5/2020 | Saxe et al. |
| 2005/0050335 | A1 | 3/2005 | Liang et al. |
| 2005/0166046 | A1 | 7/2005 | Bellovin et al. |
| 2005/0187740 | A1 | 8/2005 | Marinescu |
| 2005/0223238 | A1 | 10/2005 | Schmid et al. |
| 2006/0015630 | A1 | 1/2006 | Stolfo |
| 2008/0127336 | A1 | 5/2008 | Sun |
| 2008/0140662 | A1 | 6/2008 | Pandya |
| 2008/0140751 | A1 | 6/2008 | Ide et al. |
| 2009/0044024 | A1 | 2/2009 | Oberheide et al. |
| 2009/0100055 | A1 | 4/2009 | Wang |
| 2009/0172815 | A1 | 7/2009 | Gu |
| 2009/0293125 | A1 | 11/2009 | Szor |
| 2010/0115620 | A1 | 5/2010 | Aime |
| 2011/0154495 | A1 | 6/2011 | Stranne |
| 2011/0179484 | A1 | 7/2011 | Tuvell |
| 2011/0214161 | A1 | 9/2011 | Stolfo et al. |
| 2012/0158626 | A1 | 6/2012 | Zhu et al. |
| 2012/0159620 | A1 | 6/2012 | Seifert et al. |
| 2012/0210423 | A1 | 8/2012 | Friedrichs et al. |
| 2012/0233127 | A1* | 9/2012 | Solmer .................. G06F 16/93 707/661 |
| 2012/0233693 | A1 | 9/2012 | Stites et al. |
| 2013/0167236 | A1 | 6/2013 | Sick |
| 2013/0276114 | A1* | 10/2013 | Friedrichs ............... G06F 21/56 726/23 |
| 2014/0090061 | A1 | 3/2014 | Avasarala et al. |
| 2014/0298460 | A1 | 10/2014 | Xue et al. |
| 2015/0242626 | A1 | 8/2015 | Wang et al. |
| 2015/0302268 | A1 | 10/2015 | Collet et al. |
| 2015/0312189 | A1 | 10/2015 | Lee |
| 2015/0379427 | A1 | 12/2015 | Dirac et al. |
| 2016/0014149 | A1 | 1/2016 | Bradley et al. |
| 2016/0156460 | A1* | 6/2016 | Feng ...................... H04L 9/008 713/168 |
| 2016/0239706 | A1 | 8/2016 | Dijkman et al. |
| 2017/0017795 | A1 | 1/2017 | DiGiambattista |
| 2017/0085585 | A1 | 3/2017 | Morkovský |
| 2017/0134404 | A1 | 5/2017 | Machlica et al. |
| 2017/0228641 | A1* | 8/2017 | Sohn ...................... G06F 17/11 |
| 2017/0328194 | A1* | 11/2017 | Liu ......................... G06N 3/088 |
| 2017/0372071 | A1 | 12/2017 | Saxe |
| 2018/0285740 | A1 | 10/2018 | Smyth et al. |
| 2019/0278909 | A1 | 9/2019 | Saxe |
| 2019/0364063 | A1 | 11/2019 | Lee et al. |

OTHER PUBLICATIONS

Patterson (Semantic Hashing with Variational Autoencoders, retrieved Apr. 24, 2020 from https://pdfs.semanticscholar.org/f2c3/3951f347b5e0f7ac4946f0672fdb4ca5394b.pdf ) (Year: 2016).*

Office Action for U.S. Appl. No. 14/212,659, dated Aug. 3, 2018, 32 pages.
Schroff, F, et al., "FaceNet: A Unified Embedding for Face Recognition and Clustering," Computer Vision Foundation, 2015 [online], Retrieved from the Internet: <URL: https://www.cv-foundation.org/openaccess/content_cvpr_2015/papers/Schroff_FaceNet_A_Unified_2015_CVPR_paper.pdf>, pp. 815-823.
Doersch, C., "Tutorial on Variational Autoencoders," arXiv:1606.05908v2 [stat.ML], Aug. 16, 2016, 23 pages.
Office Action for U.S. Appl. No. 14/212,659, dated Jul. 22, 2016, 27 pages.
Office Action for U.S. Appl. No. 14/212,659, dated May 19, 2017, 29 pages.
Office Action for U.S. Appl. No. 14/212,659, dated Nov. 13, 2017, 31 pages.
Office Action for U.S. Appl. No. 14/716,290, dated Aug. 4, 2016, 15 pages.
Office Action for U.S. Appl. No. 14/716,290, dated Jun. 1, 2017, 14 pages.
Office Action for U.S. Appl. No. 15/228,728, dated Oct. 21, 2016, 9 pages.
Office Action for U.S. Appl. No. 15/616,391, dated Sep. 22, 2017, 6 pages.
International Search Report and Written Opinion for International Application No. PCT/US2017/038715, dated Sep. 6, 2017, 8 pages.
Search Report for UK Patent Application No. GB 1712454.6, dated Jan. 15, 2018, 4 pages.
Avira Virus Lab, Natural language descriptor sample page, [Online], Retrieved from the Internet: <https://web.archive.org/web/20101006002848/https://www.avira.com/en/support-virus-lab>, Retrieved on Oct. 30, 2017, 2 pages.
Berlin, K. et al., "Malicious Behavior Detection using Windows Audit Logs," Proceedings of the 8th ACM Workshop on Artificial Intelligence and Security, Oct. 16, 2015, pp. 35-44.
Bulut, I. et al., "Mobile malware detection using deep neural network," Signal Processing and Communications Applications Conference (SIU), May 15-18, 2017 (with English Abstract).
Griffin, K. et al., "Automatic Generation of String Signatures for Malware Detection," International Workshop on Recent Advances in Intrusion Detection, Springer Berlin Heidelberg, 2009, 29 pages.
Kolter, J. Z. et al., "Learning to Detect and Classify Malicious Executables in the Wild," Journal of Machine Learning Research, vol. 7, 2006, pp. 2721-2744. Based on an earlier work: Learning to Detect Malicious Executables in the Wild, in Proceedings of the Tenth ACM SIGKDD International Conference on Knowledge Discovery and Data Mining, ACM, 2004. http://doi.acm.org/10.1145/1014052.1014105.
Kong, D. et al., "Discriminant malware distance learning on structural information for automated malware classification," Proceedings of the 19th ACM SIGKDD International Conference on Knowledge Discovery and Data Mining, KDD'13, Aug. 11-14, 2013, Chicago, Illinois, pp. 1357-1365.
Morris, R., "Counting large numbers of events in small registers," Communications of the ACM, vol. 21, No. 10, Oct. 1978, pp. 840-842.
ThreatExpert—Automated Threat Analysis, Geographic Distribution of Threats, [Online], Jan. 15, 2013, Retrieved from the Internet: <URL: http://web.archive.org/web/20130115040419/http://threatexpert.com/>, Retrieved on Jan. 20, 2017, 2 pages.
Sathyanarayan, V. S. et al., "Signature Generation and Detection of Malware Families," Proceedings of the 13th Australasian Conference on Information Security and Privacy, ACISP 2008, LNCS 5107, Yi Mu et al. (eds.). Springer-Verlag, Heidelberg, pp. 336-349 (2008).
Saxe, J. et al., "Deep Neural Network Based Malware Detection Using Two Dimensional Binary Program Features," arXiv:1508.03096v2, Sep. 3, 2015, 10 pages.
Saxe, J. et al., "Deep Neural Network Based Malware Detection Using Two Dimensional Binary Program Features," 2015 10th International Conference on Malicious and Unwanted Software: "Know Your Enemy" (Malware), 2015, pp. 11-20.

(56) References Cited

OTHER PUBLICATIONS

Saxe, J. et al., "Visualization of Shared System Call Sequence Relationships in Large Malware Corpora, Proceedings of the ninth internaitonal symposium on visualization for cyber security," VizSec '12, Oct. 15, 2012, Seattle, WA, 8 pages.
Saxe, J, et al., "CrowdSource: Automated Inference of High Level Malware Functionality from Low-Level Symbols Using a Crowd Trained Machine Learning Model," IEEE, 9th International Conference, Oct. 28, 2014, pp, 68-75.
Saxe, J. "Why Security Data Science Matters and How its Different: Pitfalls and Promises of Data Science Based Breach Detection and Threat Intelligence," BlackHat USA 2015, Briefings Aug. 1-6, 2016 [Online], Retireved from the Internet: <URL: https://www.blackhat.com/us-15/briefings.html>, Retrieved on Jan. 20, 2017, 1 pages.
Saxe, J, Presentation: "Why Security Data Science Matters and How its Different: Pitfalls and Promises of Data Science Based Breach Detection and Threat intelligence," Invincea, 2015, 103 pages.
Saxe, J. et al., "eXpose: A Character-Level Convolutional Neural Network with Embeddings for Detecting Malicious URLs, File Paths and Registry Keys," arXiv:1702.08568v1 (Feb. 27, 2017), 18 pages.
Van Durme, B. et at, "Probabilistic counting with randomized storage," In Proceedings of the 21st International Joint Conference on Artificial intelligence (IJCAI'09), Hiroaki Kitano (ed,). (2009), Morgan Kaufmann Publishers Inc., San Francisco, CA, USA, 1574-1579.
Office Action for U.S. Appl. No. 15/877,676, dated Sep. 14, 2018, 6 pages.
Notice of Allowance for U.S. Appl. No. 15/877,676, dated Jan. 18, 2019, 5 pages.
Notice of Allowance for U.S. Appl. No. 15/630,495, dated Jan. 28, 2019, 14 pages.
International Preliminary Report on Patentability for International Application No. PCT/US2017/038715, dated Dec. 25, 2018, 7 pages.
Gilbert, "Convolutional Neural Networks for Malware Classification, Oct. 20, 2016, A thesis presented for the degree of Master in Artificial Intelligence", pp. 1-100.
Kolosnjaji, et al, "Empowering Convolutional Networks for Malware Classification and Analysis", no date provided, Technical University of Munich, pp. 1-8.
Office Action for U.S. Appl. No. 14/212,659, dated May 16, 2019, 36 pages.
Dahl, et al., "Large-scale malware classification using random projections and neural networks." International Workshop on Acoustic Signal Enhancement 2012, Institute of Electrical and Electronics Engineers (2013); 3422-3426.
Extended European Search Report for European Application No. 17816199.8 dated Apr. 9, 2019, 8 pages.
Wang, Y., et al., "A deep learning approach for detecting malicious JavaScript code." Security and Communications Networks (2016); 9(11): 1520-1534.
Office Action for U.S. Appl. No. 16/415,471, dated May 11, 2020, 5 pages.
Office Action for U.S. Appl. No. 16/425,115, dated May 29, 2020, 10 pages.
Notice of Allowance for U.S. Appl. No. 16/425,115, dated Aug. 24, 2020, 5 pages.
Notice of Allowance for U.S. Appl. No. 16/415,471, dated Sep. 10, 2020, 5 pages.

\* cited by examiner

METHODS AND APPARATUS FOR DETECTING AND IDENTIFYING MALWARE BY MAPPING FEATURE DATA INTO A SEMANTIC SPACE

CROSS-REFERENCE TO RELATED APPLICATIONS

This application claims priority to and the benefit of U.S. Provisional Patent Application No. 62/369,984, filed Aug. 2, 2016 and titled "Methods and Apparatus for Detecting and Identifying Malware by Mapping Feature Data into a Semantic Space," which is incorporated herein by reference in its entirety.

BACKGROUND

Embodiments described herein relate generally to efficiently processing data from potential malware files to determine relationships between the potential malware files, and known malware threats.

In some known systems, characteristics of a malware file may be used to identify the type of malware detected. However, determining the most useful characteristics from a potential malware file can be difficult and resource-intensive since identifying different malware threats can involve identifying different characteristics to extract and compare with known malware threats. For example, certain characteristics of a given malware file can be better for identifying some malware threats than other characteristics of the malware file. Alternatively, characteristics for some types of suspected malware threats can be difficult to compare with known malware threats when those characteristics are not represented in a particular format. Determining the best manner in which to represent characteristics for a potential malware threat, however, can also be difficult and resource-intensive.

Accordingly, a need exists for methods and apparatus that can process features of malware files to determine how to represent and process characteristics of a potential malware threat.

SUMMARY

In some embodiments, an apparatus includes a memory and a processor operatively coupled to the memory. The processor is configured to identify a feature vector for a potentially malicious file and provide the feature vector as an input to a trained neural network autoencoder to produce a modified feature vector. The processor is configured to generate an output vector by introducing Gaussian noise into the modified feature vector to ensure a Gaussian distribution for the output vector within a set of modified feature vectors. The processor is configured to provide the output vector as an input to a trained neural network decoder associated with the trained neural network autoencoder to produce an identifier of a class associated with the set of modified feature vectors. The processor is configured to perform a remedial action on the potentially malicious file based on the potentially malicious file being associated with the class.

DETAILED DESCRIPTION

Figure 1:
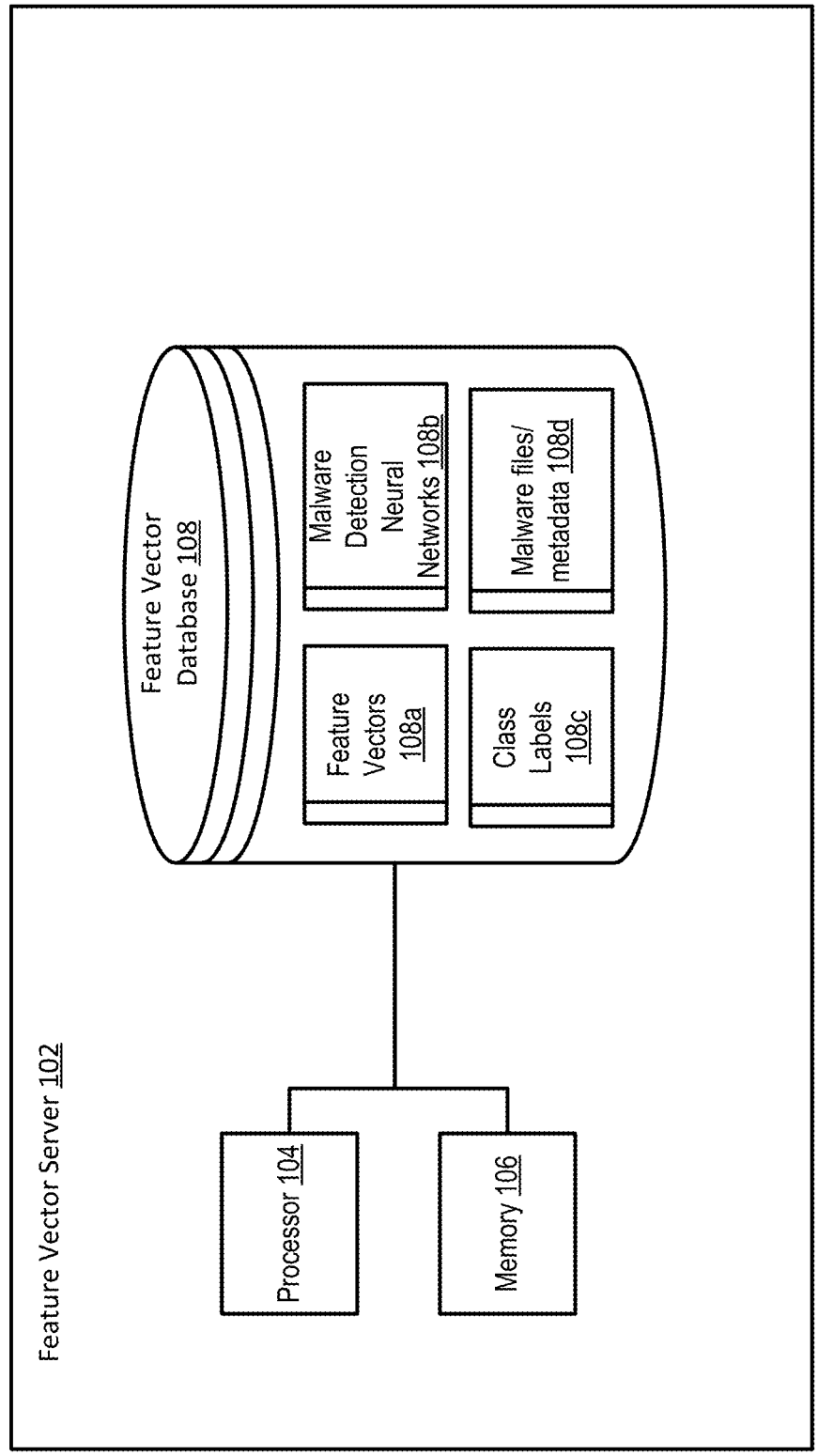
FIG. 1 is a diagram illustrating a feature vector server, according to an embodiment.

In some implementations, a processor can extract features from a potential malware file. In one embodiment, the processor can train a deep neural network to modify the features to more closely identify a match between the potential malware file and known samples of malware files. The deep neural network can be trained based on triple loss function neural networks and/or based on variational autoencoder neural networks. The processor can then identify an identity of the potential malware file based on matching the modified features to known malware samples.

In some embodiments, an apparatus includes a memory and a processor operatively coupled to the memory. The processor is configured to identify a feature vector for a potentially malicious file and provide the feature vector as an input to a trained neural network autoencoder to produce a modified feature vector. The processor is configured to generate an output vector by introducing Gaussian noise into the modified feature vector to ensure a Gaussian distribution for the output vector within a set of modified feature vectors. The processor is configured to provide the output vector as an input to a trained neural network decoder associated with the trained neural network autoencoder to produce an identifier of a class associated with the set of modified feature vectors. The processor is configured to perform a remedial action on the potentially malicious file based on the potentially malicious file being associated with the class.

In some embodiments, a method includes training a triple-loss function neural network by providing an anchor feature vector associated with a first class, a training feature vector associated with the first class, and a training feature vector associated with a second class different from the first class. The method includes identifying a feature vector for an artifact and providing the feature vector as an input to the triple-loss function neural network to produce a modified feature vector. The method can further include classifying the artifact as associated with a class of artifacts based on a distance between the modified feature vector and a set of modified feature vectors from multiple sets of modified feature vectors being less than a distance between the modified feature vector and each remaining set of modified feature vectors from the multiple sets of modified feature vectors. The set of modified feature vectors is associated with the class of artifacts. The method can include performing an action associated with the artifact based on the artifact being classified as associated with the class of artifacts.

In some implementations, a non-transitory processor-readable medium stores code representing instructions to be executed by a processor. The code includes code to cause the processor to identify a feature vector for an artifact and provide the feature vector as an input to a machine learning model to produce a modified feature vector. The code further includes code to classify the artifact as associated with a class of artifacts based on a distance between the modified feature vector and a set of modified feature vectors from multiple sets of modified feature vectors being less than a distance between the modified feature vector and each remaining set of modified feature vectors from the multiple sets of modified feature vectors. The set of modified feature vectors is associated with the class of artifacts. The code further includes code to perform an action associated with the artifact based on the artifact being classified as associated with the class of artifacts.

As used herein, an artifact can be or include, for example, any dataset(s), filepath(s), Uniform Resource Locator (URL), file(s), device(s), device behavior, user behavior, network behavior, network identifier, and/or entity represented and/or associated with computer-related resources. For example, an artifact can include a function of software code, a webpage(s), a data file(s), a model file(s), a source file(s), a script(s), a process, a binary executable file(s), a table(s) in a database system, a development deliverable(s), an active content(s), a word-processing document(s), an e-mail message(s), a text message, a network address, a device or entity (e.g., a network-connected compute device and/or computer system, a server, a smartphone, a tablet a laptop, a multimedia device, etc.), a network address (e.g., a Media Control (MAC) address, Internet Protocol (IP) address, etc.) of a compute device, and/or the like.

FIG. 1 is a diagram illustrating a feature vector server 102. For example, in some implementations, a feature vector server 102 can collect information relating to data files (or other artifacts), and can classify the artifacts (e.g., determine whether or not the data files are malicious or benign). For example, the feature vector server 102 can include at least one processor 104, at least one memory 106, and at least one feature vector database 108.

The at least one processor 104 can be any hardware module and/or component configured to receive and process data, and/or to execute code representing executable instructions. In some embodiments, the at least one processor 104 can be a general purpose processor, a Field Programmable Gate Array (FPGA), an Application Specific Integrated Circuit (ASIC), a Digital Signal Processor (DSP), and/or the like. The at least one memory 106 can be a hardware module and/or component configured to store data accessible by the at least one processor 104, and/or to store code representing executable instructions for the at least one processor 104. The memory 106 can be, for example, a random access memory (RAM), a memory buffer, a hard drive, a database, an erasable programmable read-only memory (EPROM), an electrically erasable read-only memory (EEPROM), a read-only memory (ROM) and/or so forth. In some instances, the memory 106 stores instructions to cause the processor 104 to execute modules, processes and/or functions associated with the feature vector server 102.

In some implementations, the at least one feature vector database 108 can be a database, data store, file, and/or other structure configured to store a feature vector table 108a, a malware detection neural network data structure table 108b, and/or other data for identifying malware threats. The at least one feature vector database 108 can be stored in the at least one memory, and/or can be stored separately from the at least one memory. For example, a feature vectors table 108a of the at least one feature vector database 108 can store feature vectors generated based on malware samples received at the feature vector server 102. Feature vectors can include characteristics and/or features of a potential malware file that can be used to identify potential characteristics of a malware threat. A record in the feature vectors table 108a can include, for example, a feature vector identifier, an array and/or other data structure including values used to form a feature vector, a classifier associated with the feature vector, a malware type associated with the feature vector, and/or other data that can identify the feature vector.

A malware detection neural network data structures table 108b can store data structures embodying deep neural networks configured to process feature vectors to identify potential malware threats. Such deep neural networks can include triple loss function neural networks, variational autoencoder neural networks, and/or other deep neural networks. For example, a record in the malware detection neural network data structures table 108b can include, for example, a malware detection neural network identifier, a graph and/or similar data structure representing a malware detection neural network data structure, an indicator indicating whether the malware detection neural network data structure has been trained, a timestamp indicating a last date and/or time at which the malware detection neural network data structure was trained, and/or similar information that can be used with the malware detection neural network to process feature vectors.

A class label table 108c can store data structures of class labels that can keep track of which feature vectors are associated with a given class. For example, a record in the class label table 108c can include, for example, a class label identifier, a class label name, a class Gaussian distribution, a list of feature vectors and/or malware files associated with the class, and/or similar information.

A malware file table 108d can store malware sample files and/or related metadata. For example, a record in the malware file table 108d can include, for example, a malware sample file identifier, a malware sample file, malware sample file metadata, a timestamp of when the malware sample file was stored, a feature vector identifier associated with the malware sample file, and/or similar information.

In some implementations, for example, the at least one processor 104 can be configured to use feature vectors (e.g., generated from suspected malware samples and/or retrieved from the feature vectors table 108a of the at least one feature vector database 108) as input to a malware detection neural network (e.g., retrieved from the malware detection neural network data structures table 108b of the at least one feature vector database 108). The malware detection neural network can output information that can be used to identify suspected malware. The output information may be used in combination with other information to identify suspected malware or to convict suspected malware as malware.

Figure 2:
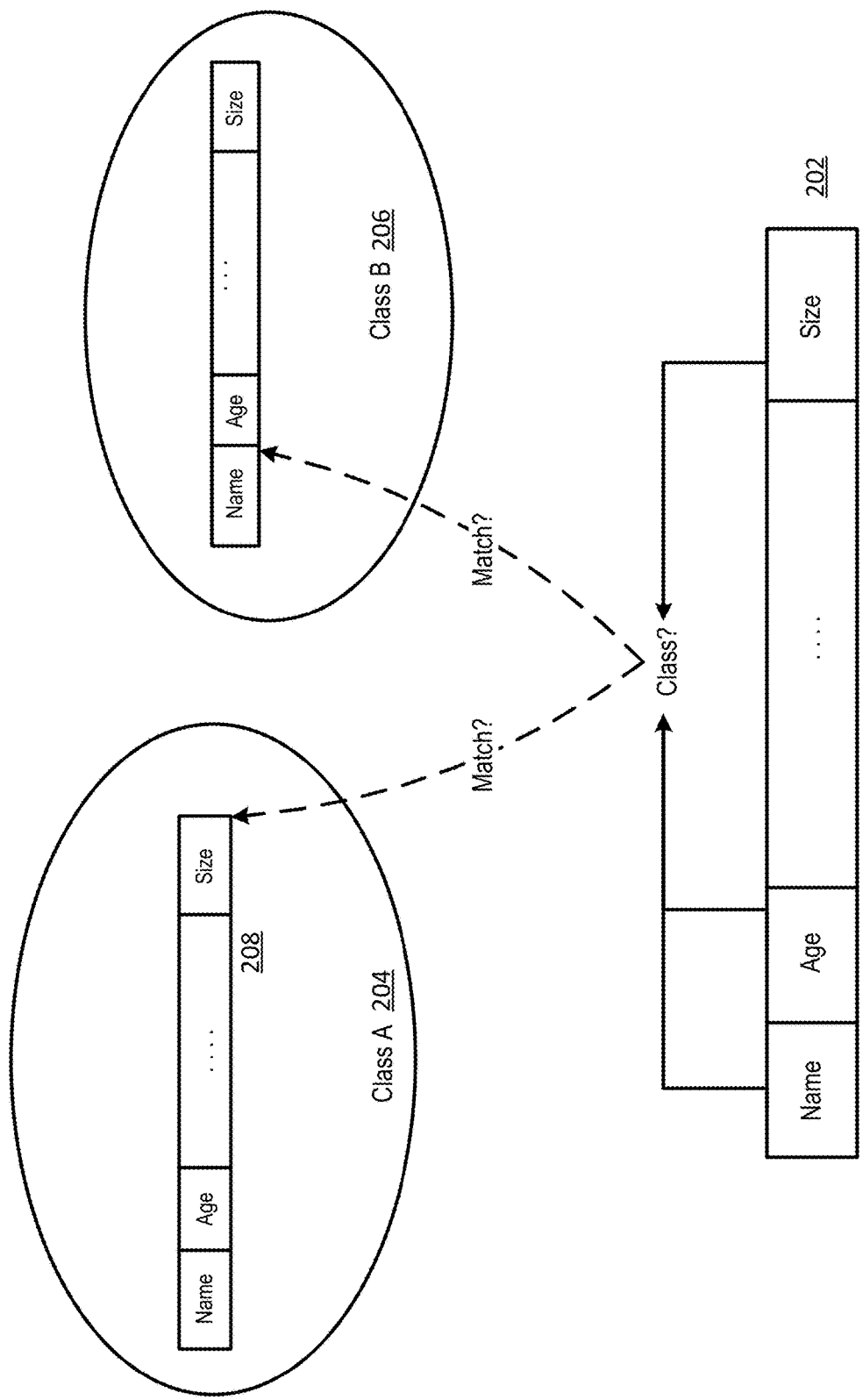
FIG. 2 is a diagram illustrating classifying features of a potential malware threat, according to an embodiment.

FIG. 2 is a diagram illustrating classifying features of a potential malware threat. For example, in some implementations, the at least one processor 104 can classify feature vectors into multiple classes and/or families 204 and 206, each representing a different malware threat, a different malware source, a likelihood that the threat is malware, a degree of threat, and/or similar classifications. Each class can include one or more feature vectors 208 (and/or malware samples from which feature vectors can be derived). When the at least one processor 104 receives a potential malware file, the at least one processor 104 can generate a feature vector 202, e.g., based on features of the malware file that can be derived from metadata and/or other data from the potential malware file. For example, a feature vector 202 can include metadata relating to a name of the potential malware file, an age of the potential malware file, a size of the potential malware file, a location of the potential malware file, a provenance of a potential malware file, a prevalence of a potential malware file, a pedigree of a potential malware file, a reputation of a potential malware file, an author of the potential malware file, an owner of a potential malware file, a user of a potential malware file, an application category associated with the potential malware file, a type of encoding (e.g., encryption, compression) associated with the potential malware file, specific characters and/or strings within the potential malware file, information derived from characters and/or strings within the potential malware file, opcodes associated with the potential malware file, information derived from analysis of the binary data of the potential malware file, behavior of a potential malware file, abstracted functionality of the malware file, dynamic traces associated with the potential malware file, behavior features of the malware file, information retrieved by running the potential malware file, data output by the potential malware file and/or other characteristics of the potential malware file. The at least one processor 104 can generate a class-tagged feature vector, e.g., by using a malware detection neural network to process the feature vector 202. The at least one processor 104 can then match the class-tagged feature vector to feature vectors 208 in that class, so as to identify the potential malware sample.

Figure 3:
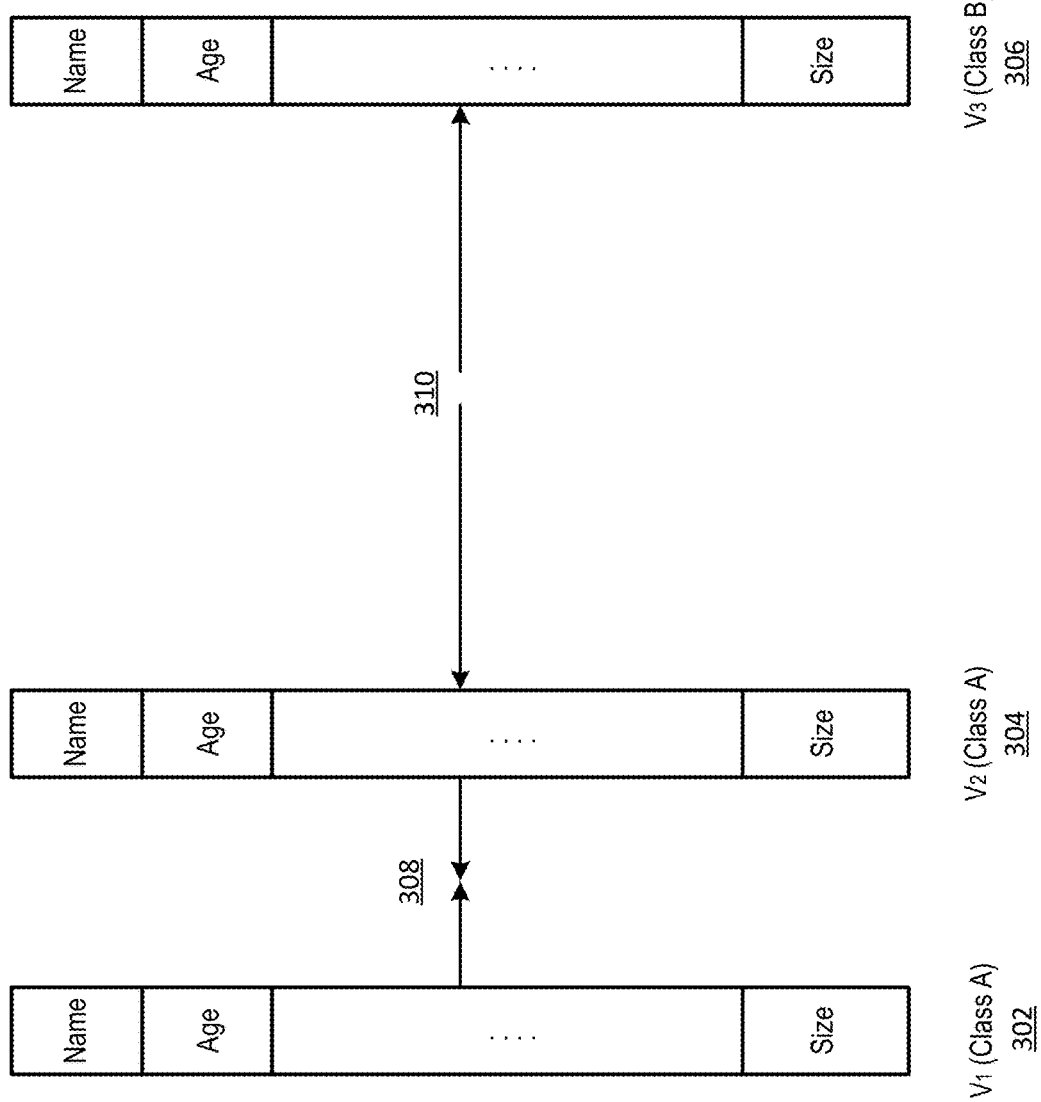
FIG. 3 is a diagram illustrating determining distances based on malware classifications, according to an embodiment.

FIG. 3 is a diagram illustrating determining distances based on malware classifications. For example, in some implementations, the at least one processor 104 can calculate distances between feature vectors, e.g., to represent a degree of similarity between the feature vectors. In some implementations, for example, feature vectors associated with the same class can be closer and/or more similar to each other, than feature vectors of different classes. Thus, given a first vector 302 associated with a first class, a second vector 304 associated with the first class, and a third vector 306 associated with a second class, a distance 308 between the first vector 302 and the second vector 304 can be less than a distance 310 between the second vector 304 and the third vector 306.

In some implementations, a malware detection neural network can also modify feature vectors, so as to ensure that a distance between feature vectors associated with the same class is smaller (e.g., by some factor) than a distance between a feature vector of that class, and a feature vector of a different class. In some implementations, for example, a malware detection neural network can modify a feature vector, such that a distribution of the feature vectors associated with a given class follow a Gaussian distribution. For example, after the at least one processor 104 calculates a feature vector for a potential malware sample, the malware detection neural network can transform the feature vector such that the feature vector is associated with a particular position in a semantic space (e.g., such that the distance between the transformed feature vector and other feature vectors in the database is modified to reflect a semantic relationship between feature vectors in the class, and feature vectors outside of the class). In some implementations, the distribution of the feature vectors in the semantic space can be modified, such that the distribution follows a Gaussian distribution, and/or a similar mathematical model. Thus, once a new feature vector has been modified to fit within the semantic space of a particular class, the at least one processor 104 can use a distance (e.g., a Euclidean distance, Hamming distance, and/or a similar distance function) between the new feature vector and feature vectors associated with the class to determine relationships between the new feature vector, and feature vectors associated with the class.

Figure 4:
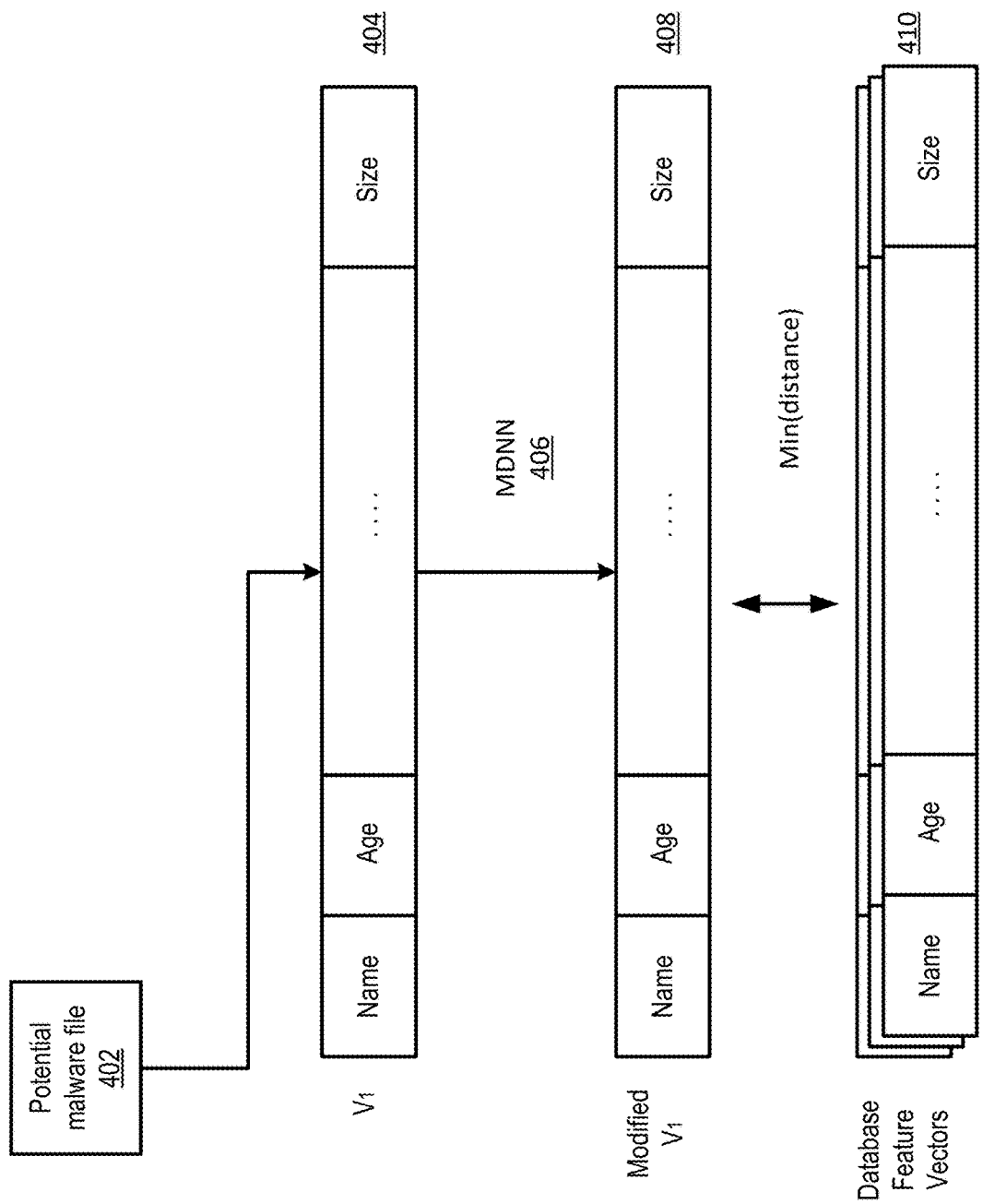
FIG. 4 is a diagram illustrating modifying feature vectors, according to an embodiment.

FIG. 4 is a diagram illustrating modifying feature vectors. For example, in some implementations, the at least one processor 104 can generate a feature vector 404, e.g., using information extracted from a potential malware file 402 (e.g., such as file attributes, file metadata, behavior information, and/or other information). Using a malware detection neural network 406 (e.g., such as a Siamese neural network and/or a similar neural network using a triple loss function, a variational autoencoder neural network, and/or a similar neural network), the at least one processor 104 can generate a modified feature vector 408, e.g., to map the feature vector to a semantic space of a class with which the feature vector can be associated. The at least one processor 104 can then calculate distances between the modified feature vector 408, and other feature vectors 410 associated with the class. A smaller distance calculated between the modified feature vector 408 and at least one the other feature vectors 410, can indicate a stronger relationship between the modified feature vector 408 and that feature vector 410. Thus, the at least one processor 104 can determine a potential identity of the potential malware file, based on determining which feature vector 410 is closest to the modified feature vector 408.

Figure 5:
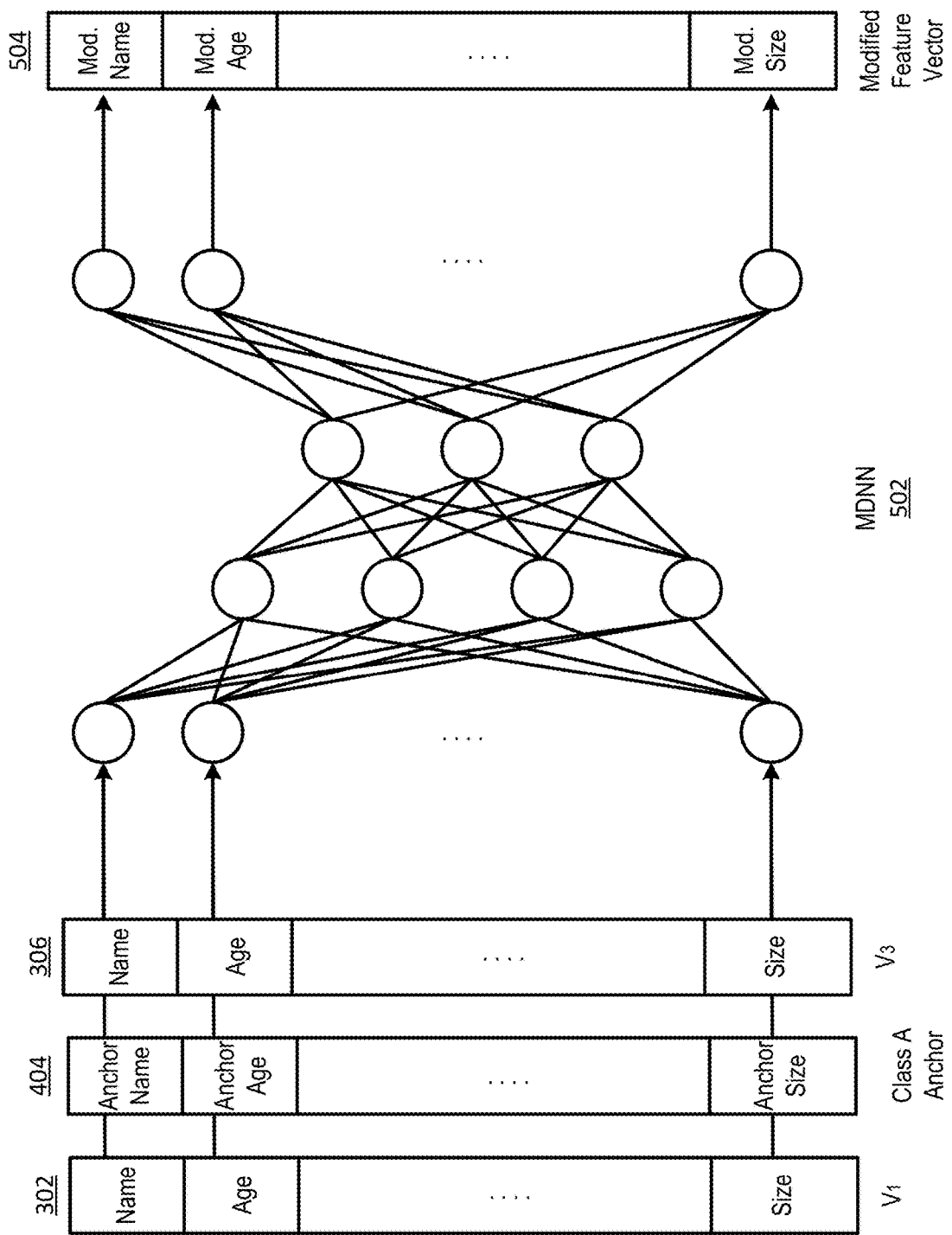
FIG. 5 is a diagram illustrating training a triple loss function neural network to modify a feature vector, according to an embodiment.

FIG. 5 is a diagram illustrating training a triple loss function neural network to modify a feature vector. For example, in some implementations, the malware detection neural network 502 can be trained to determine how to modify a vector to fit within a given class, using triples of feature vectors. For example, the at least one processor 104 can form triples including a class anchor vector 404, a feature vector 302 associated with the same class as the class anchor vector, and a feature vector 306 associated with a class different from the class associated with the class anchor vector. The class anchor vector can be a feature vector of a particular class that has been selected as being representative of the feature vectors associated with that class. By training using triples with these three feature vectors, the at least one processor 104 can train the malware detection neural network 502 to detect differences between feature vectors of different classes, to identify a class with which to associate a given feature vector, and to modify the feature vector based on the feature vector's association with a given class.

For example, the at least one processor 104 can feed each feature vector from a feature vector triple as input to the malware detection neural network 502. The malware detection neural network 502 can produce modified feature vectors 504 that can be used to determine error rates of the malware detection neural network 502. If the malware detection neural network 502 is undergoing supervised learning, the malware detection neural network 502 can receive feature vectors that already include class attributes, and can determine how to calculate distances between feature vectors associated with various classes, based on those class attributes. If the malware detection neural network 502 is undergoing unsupervised learning, the at least one processor 104 can feed each of the triples as input to the malware detection neural network 502 without class attributes, such that the malware detection neural network 502 determines to which class each feature vector can belong, as well as distances between feature vectors associated with the same, or a different, class. The at least one processor 104 can train the malware detection neural network 502 until predetermined criteria have been met (e.g., until a predetermined number of training epochs have been completed, and/or based on other criteria).

Figure 6:
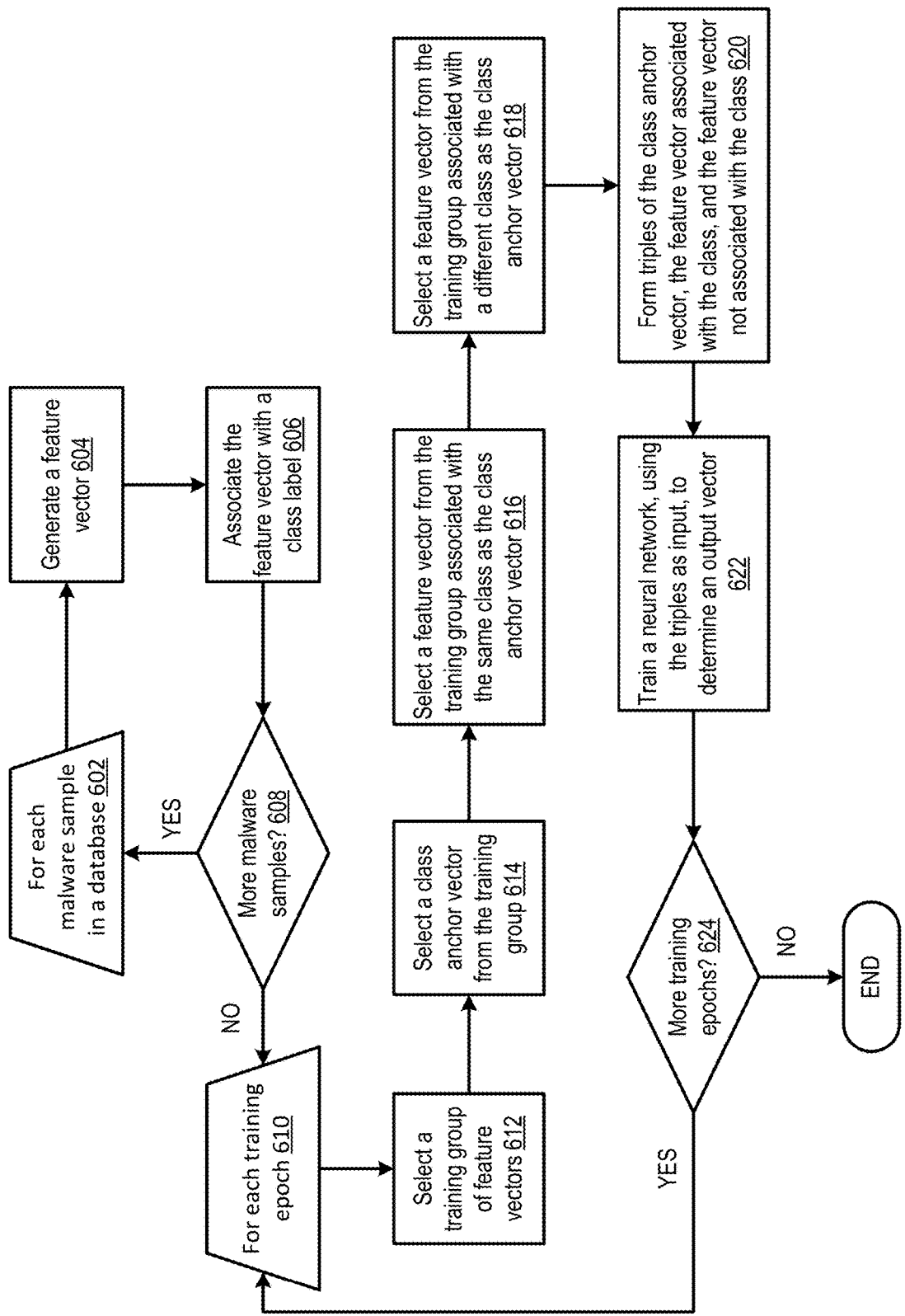
FIG. 6 is a logic flow diagram illustrating training a triple loss function neural network, according to an embodiment.

FIG. 6 is a logic flow diagram illustrating training a triple loss function neural network. For example, in some implementations, the feature vector server 102 (i.e., via the at least one processor 104) can, for each malware sample in the feature vector database 108, at 602, generate, at 604, a feature vector representing characteristics of that malware sample. The at least one processor 104 can associate, at 606, the feature vector with a class label (e.g., from the class label table 108*c* of the feature vector database 108). The at least one processor 104 can determine, at 608, whether there are more malware samples to process, and can continue to generate feature vectors and associate the feature vectors with a class label for any additional malware samples (at 604 and 606). If feature vectors have been generated for each malware sample file, the at least one processor 104 can begin a training epoch (e.g., a round of training for the triple loss function neural network). For example, for each training epoch, at 610, the at least one processor 104 can select, at 612, a training group of feature vectors, from the feature vectors stored in the feature vector database 108. For example, in some implementations, the at least one processor 104 can select a random group of feature vectors from the feature vector database 108 for training.

The at least one processor 104 can, from the training group of feature vectors, select, at 614, a class anchor vector from the training group. In some implementations, the class anchor vector can be selected randomly. The class anchor vector can serve as a baseline against which other features in the training group can be compared. The at least one processor 104 can also select, at 616, a feature vector from the training group that is associated with the same class as the class anchor vector (e.g., by selecting another feature vector from the training group that is associated with the same class label as the class anchor vector), and can select, at 618, a feature vector from the training group that is associated with a different class as the class anchor vector (e.g., by selecting another feature vector from the training group that is associated with a different class label). The at least one processor 104 can form, at 620, a triple including the class anchor vector, the feature vector associated with the same class, and the feature vector associated with the different class. In some implementations, the at least one processor 104 can generate multiple triples to be input for training during the training epoch, where each triple is a possible combination of feature vectors from the training group that include an anchor vector, a feature vector of the same class, and a feature vector of a different class. In some implementations, the feature vector of the same class and the feature vector of the different class can be randomly selected from the training group. In some implementations, the feature vector of the same class and the feature vector of the different class can be the largest outliers of the training group (e.g., the feature vector of the same class can be a feature vector with the largest distance between that feature vector and the anchor vector, while still ensuring that the feature vector and the anchor vector are of the same class, and/or the like).

The at least one processor 104 can then train, at 622, the triple loss function neural network by providing the triple as training input to the triple loss function neural network. For example, the triple loss function neural network can be trained to learn associations between class labels and feature information, while also learning how to modify feature vectors based on class distance preferences. For example, the triple loss function neural network can be trained to modify feature vectors, such that feature vectors associated with a first class will be close to each other in distance (e.g., will be determined to be more similar to each other), and feature vectors associated with a second class will be further away in distance, to feature vectors associated with the first class, than feature vectors associated with the first class are to each other (e.g., feature vectors of different classes will be determined to be less similar with each other than they are to feature vectors associated with the same class).

In some implementations, the triple loss function neural network can be trained such that a difference between an average distance between feature vectors associated with the same class, and an average distance between feature vectors associated with different classes, exceeds a predetermined threshold (e.g., that a distance between feature vectors associated with the same class is smaller, by some factor, than a distance between a feature vector of that class, and a feature vector of a different class). The triple loss function neural network can also be trained such that the average distance between feature vectors associated with the same class falls below a predetermined threshold. If the at least one processor 104 has determined, at 624, that there are more training epochs, the at least one processor 104 can continue to select training groups and to train the triple loss function neural network. If the at least one processor 104 has determined that predetermined criteria have been met (e.g., the predetermined number of epochs have been reached, an overall error rate of the triple loss function neural network has converged, and/or the like), the at least one processor 104 can end the training process.

Figure 7:
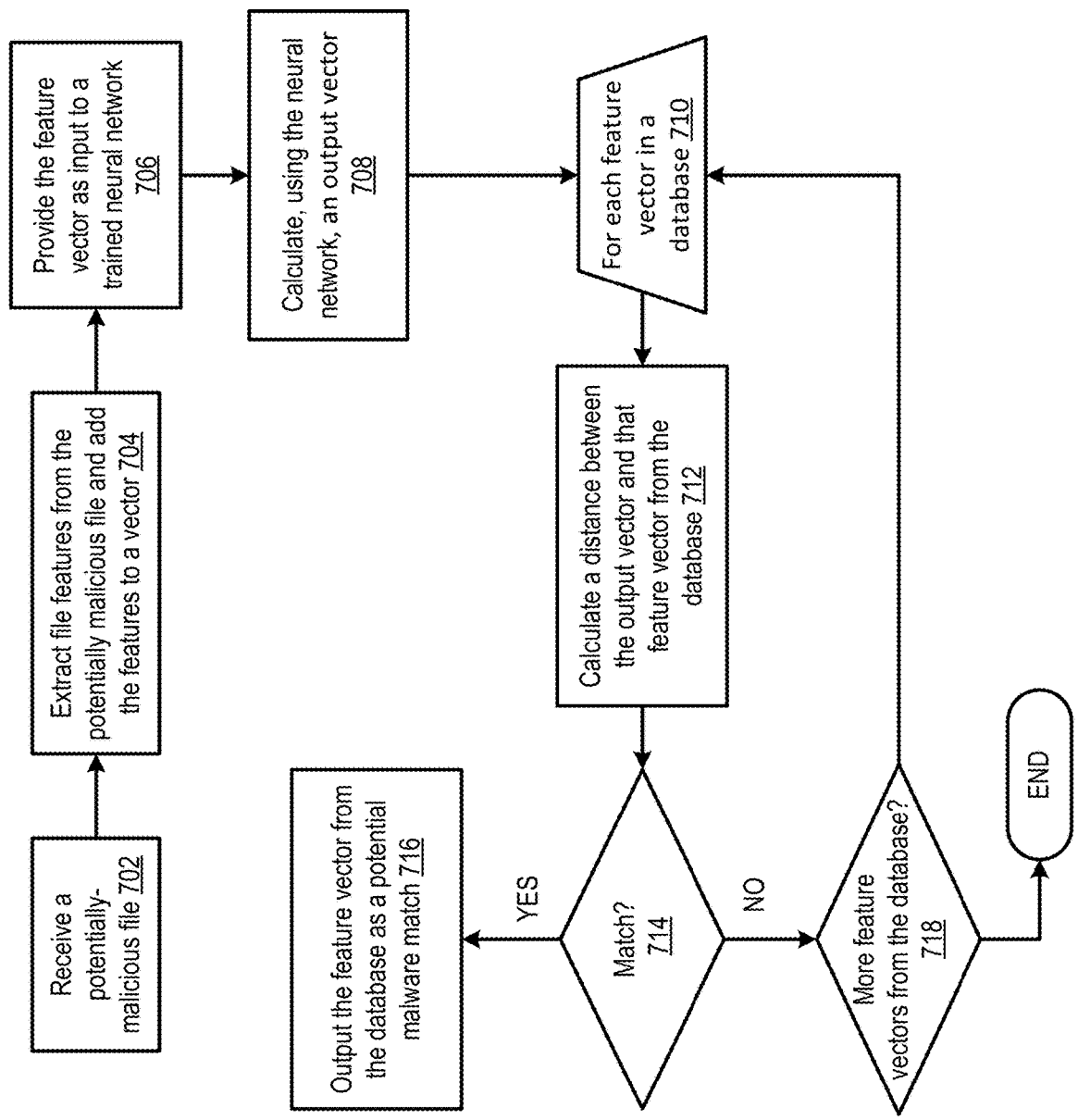
FIG. 7 is a logic flow diagram illustrating identifying a malware threat using a triple loss function neural network, according to an embodiment.

FIG. 7 is a logic flow diagram illustrating identifying a malware threat using a triple loss function neural network. For example, in some implementations, the feature vector server 102 (i.e., via the at least one processor 104) can receive, at 702, a potentially-malicious file. For example, a client device, separate server, and/or other networked device can send a potentially-malicious file to the feature vector server 102. The at least one processor 104 can extract, at 704, file features and/or characteristics from the potentially-malicious file, and can add the features to a vector to form a feature vector. The at least one processor 104 can provide, at 706, the feature vector as input to a trained neural network (e.g., see at least FIG. 6 for more details on training the neural network). The at least one processor 104 can use the trained neural network to calculate, at 708, an output vector (e.g., an embedding vector). For example, the trained neural network can be trained to identify a class of the feature vector, based on the values included in the feature vector. The output vector (e.g., embedding vector) can represent a modified feature vector, e.g., that has been modified to provide additional meaning, context and/or to more closely resemble other feature vectors in that class.

The at least one processor 104 can then, in some implementations, use the output vector to identify a malware threat. Specifically, for each feature vector in the feature vector database 108, at 710, the at least one processor 104 can calculate, at 712, a distance between the output vector and that feature vector. The at least one processor 104 can determine, at 714, whether or not there is a potential match between the output vector and that feature vector based on the distance (e.g., can determine that there is a match if the distance is below a predetermined threshold, or is the smallest distance calculated, and can determine that there is not a match if the distance is above a predetermined threshold, or if the distance is not the smallest distance calculated between the two vectors). If the output vector matches the feature vector, the at least one processor 104 can output, at 716, that feature vector (and information relating to the sample malware file associated with that feature vector) as a potential match to the potentially-malicious file. For example, the at least one processor 104 can send the information relating to the sample malware file and the feature vector to the client device and/or other networked device that sent the potentially-malicious file, can render the results of the distance calculations in a user interface, and/or can output the information through similar means. The at least one processor 104 can also automatically take remedial measures (e.g., can instruct the client device and/or other device to quarantine and/or delete the malicious file, and/or the like). If the output vector and the feature vector are determined to not be a match, the at least one processor 104 can determine, at 718, whether or not there are more features in the database that have not been processed, and can continue to calculate distances between output vectors and feature vectors.

Figure 8A:
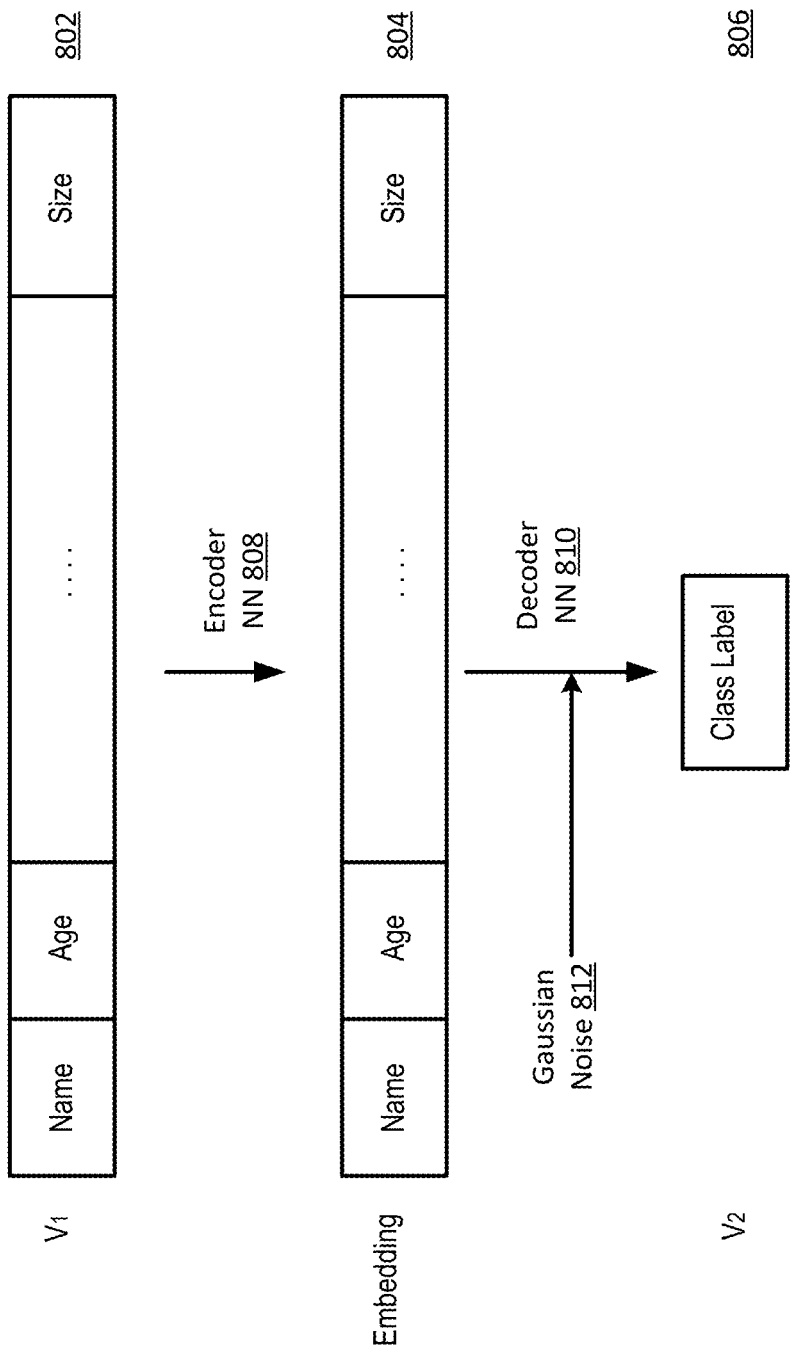
FIG. 8a is a logic flow diagram illustrating variational autoencoder and decoder neural networks, according to an embodiment.

FIG. 8a is a logic flow diagram illustrating variational autoencoder and decoder neural networks. For example, in some implementations, rather than using a neural network that relies on a triple loss function, the at least one processor 104 can use a variational autoencoder neural network 808 to encode feature vectors 802 into embedding vectors 804. Embedding vectors 804 can be modified feature vectors that can be matched with feature vectors stored in the feature vector database 108, so as to identify a malware threat represented by the embedding vector 804. A decoder neural network 810 can be used to identify a class label 806 by decoding the embedding vector 804. In some implementations, for example, if the decoder neural network 810 is trained using supervised learning techniques (e.g., where a class label is provided to the decoder neural network 810 as an expected result of processing the embedding vector 804), the decoder neural network 810 can output a class label associated with the original feature vector 802 when the embedding vector 804 is provided as input to the decoder neural network 810.

In some implementations, the at least one processor 104 can also add Gaussian noise 812 to the embedding vector 804, and/or can otherwise modify the embedding vector 804, e.g., before providing the embedding vector 804 as input to the decoder neural network 810. Adding Gaussian noise 812 can help preserve Gaussian distribution of the feature vectors with the same class and/or family, while ensuring that the embedding vector 804 includes sufficient context that can help the decoder neural network 810 determine the class label 806. Specifically, the Gaussian noise can ensure that the variational autoencoder neural network 808 is trained to generate an embedding vector 804 that is invariant under Gaussian noise, while also ensuring that the embedding vector 804 includes enough information to determine a class label 806 associated with the original feature vector 802. Using the decoder neural network 810, the at least one processor 104 can calculate distances between a modified embedding vector and other modified embedding feature vectors stored in the feature vector database 108 to determine vectors that are similar to the embedding vector, to identify a resulting malware class and/or threat.

Figure 8B:
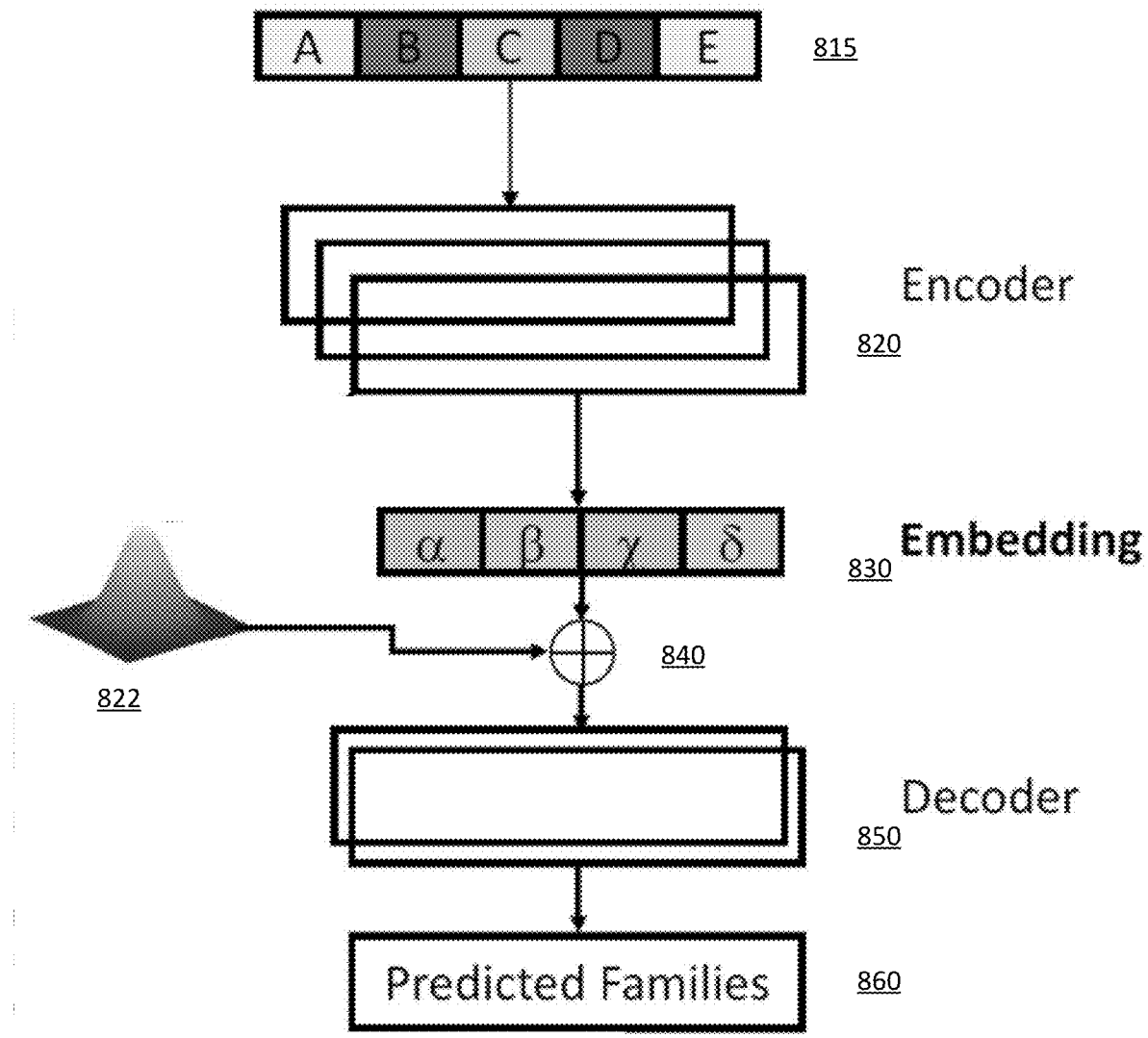
FIG. 8b is a flow diagram illustrating a variational autoencoder and decoder for predicting families, according to an embodiment.

FIG. 8b is a flow diagram illustrating variational autoencoder and decoder neural networks for predicting families of artifacts (e.g., different classes of artifacts), according to an embodiment. For example, in some implementations, a processor (e.g., the at least one processor 104 as shown in FIG. 1) can use a variational autoencoder neural network 820 to encode an extracted feature vector 815 into an embedding vector 830. As discussed above, the embedding vector 830 can represent a modified feature vector (e.g., that has been modified to provide additional meaning, context and/or to more closely resemble other feature vectors in that class). In some instances, at 840, the processor can also add noise 822 (e.g., Gaussian noise) to, and/or otherwise modify, the embedding vector 830 to ensure the embedding vector 830 follows a particular distribution (e.g., a Gaussian distribution) within the semantic space of the family and/or class associated with that feature vector 815. The decoder neural network 850 can receive the embedding vector 830 including the added Gaussian noise as an input to determine, a class label 860 (and/or predicted family) associated with the original feature vector 815.

Figure 9:
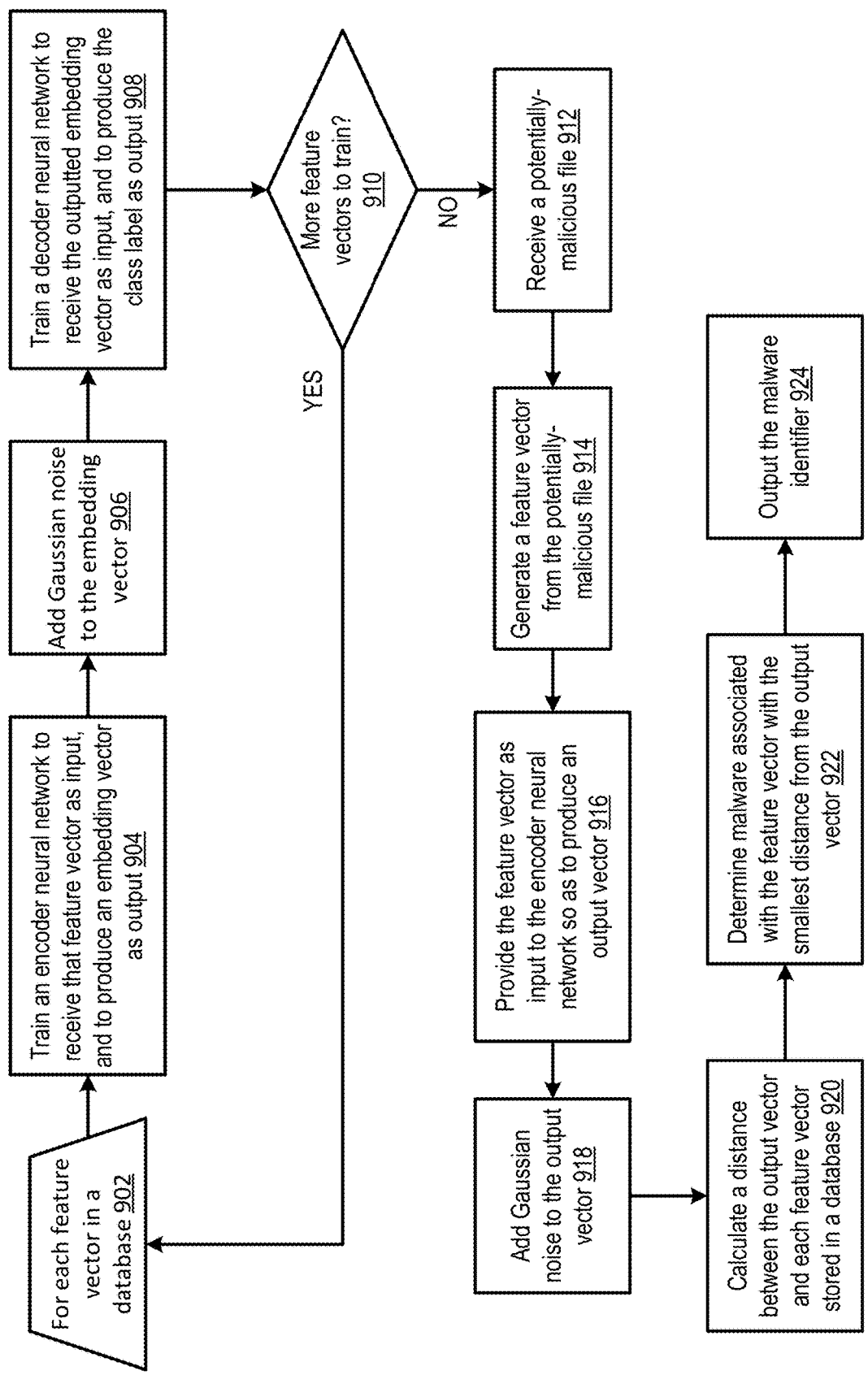
FIG. 9 is a logic flow diagram illustrating identifying a malware threat using a variational autoencoder neural network, according to an embodiment.

FIG. 9 is a logic flow diagram illustrating identifying a malware threat using a variational autoencoder neural network (e.g., variational autoencoder neural network 808 of FIG. 8a and/or variational autoencoder neural network 820 of FIG. 8b). For example, in some implementations, for each vector in a vector database, at 902, the feature vector server 102 (i.e., via the at least one processor 104) can train, at 904, a variational autoencoder neural network to receive that feature vector as an input, and to produce an embedding vector as an output. For example, the at least one processor 104 can provide the feature vector as an input to a variational autoencoder neural network configured to modify the feature vector to produce an embedding vector that can be used to identify malware threats in the feature vector database 108. The at least one processor 104 can also train, at 908, a decoder neural network (e.g., decoder neural network 810 of FIG. 8a and/or decoder neural network 850 of FIG. 8b) to receive the outputted embedding vector as input to determine class labels associated with the original feature vector. For example, using the embedding vector as input, the decoder neural network can be trained to analyze and/or classify the embedding vector to produce the class label, the original feature vector, and/or similar information, based on whether or not the decoder neural network is being trained using supervised learning, unsupervised learning, and/or a similar technique (respectively). For example, in some implementations, the decoder neural network can be trained to conduct a nearest neighbor analysis and/or determine distances between feature vectors of a same class and/or family, similar the distance analysis described above. In some implementations, Gaussian noise can be added, at 906, to the embedding vector to ensure that the embedding vector, when mapped to semantic space, follows Gaussian distribution in comparison with feature vectors in the feature vector database 108. The at least one processor 104 can determine, at 910, whether there are additional feature vectors with which to train the variational autoencoder neural network 808, and can continue to train the neural networks if there are additional features.

The at least one processor 104 can also receive, at 912, (e.g., from an external source such as a client device, a different server, and/or the like) a potentially-malicious file. The at least one processor 104 can generate, at 914, a feature vector from the potentially-malicious file, e.g., by extracting features and/or characteristics from the potentially-malicious file and adding them to a vector. The at least one processor 104 can provide, at 916, the feature vector to the variational autoencoder neural network to produce an output vector. Specifically, the variational autoencoder neural network can receive the feature vector as input, and can modify the feature vector to change the feature vector into an embedding vector. The at least one processor 104 can also add, at 918, Gaussian noise to, and/or otherwise modify, the output vector, so as to ensure the output vector follows Gaussian distribution within the semantic space of the class associated with that output vector.

The at least one processor 104 can provide the output vector as an input to the decoder neural network. In some instances, the decoder neural network conduct a nearest neighbor analysis and/or determine distances between feature vectors of a same class and/or family. Specifically, the at least one processor 104 (executing the decoder neural network) can calculate, at 920, distance values between the output vector, and feature vectors and/or malware samples, stored in the feature vector database 108. Specifically, for each feature vector stored in the feature vector database 108 (and/or for a portion of the feature vectors stored in the feature vector database 108), the at least one processor 104 can calculate a distance between that feature vector, and the output vector. The at least one processor 104 (executing the decoder neural network) can determine, at 922, an identity of malware associated with a feature vector that is the smallest distance from the modified output vector. Said another way, once the at least one processor 104 can identify a feature vector that is the closest to the output vector, the at least one processor 104 can determine an identity of the potentially-malicious file (e.g., identify a class and/or family associated with the potentially-malicious file), by determining an identity (or class or family) of a malware sample that is associated with that feature vector. The at least one processor 104 (executing the decoder neural network) can output, at 924, information associated with the identified malware, such as a class and/or family label, a malware name, identifier, malware source, and/or other information identifying the malware threat. For example, the at least one processor 104 can send the information relating to the identified malware to the client device and/or other networked device that sent the potentially-malicious file, can render the malware information in a user interface, can automatically instruct the client device and/or other networked device to take remedial action (including deleting and/or quarantining the malicious file, and/or the like) and/or can output the information through similar means.

While shown and described with respect to FIGS. 8*a*, 8*b* and 9 as outputting a class label, predicted family and/or malware identifier, in other instances, any other data, information, vector, identifier and/or property can be output from the decoder neural network (e.g., decoder neural network 810 of FIG. 8*a* or decoder neural network 850 of FIG. 8*b*). For example, the decoder neural network can output an identifier of a predicted dynamic execution application programming interface (API) call identified as associated with the extracted feature vector and/or any other information identified as associated with the feature vector, class and/or family.

While methods and apparatuses described above are described as being used for detecting malware, in other implementations, methods and apparatuses described herein can be used with any data processing involving making a determination about data based on a number of features of the data (e.g., including but not limited to malware, image processing, and/or the like).

While discussed herein as classifying malware, in other implementations, the systems and methods described herein (e.g., the feature vector server 102 shown and described with respect to FIG. 1) can be implemented to identify and/or classify any other type of artifact. For example, the systems and methods described herein can be used to classify one or more computer files and/or one or more portions of a computer file. The computer file can be of one or more file types such as, for example, a document, a spreadsheet, a presentation, an executable, an application data file, a temporarily stored file, a mountable image file, and/or the like, including any suitable file extension, such as, for example '.exe', '.txt', '.doc', '.pdf', '.xlsx', 'ppt' and/or other file extensions.

In some instances, the feature vector server 102 can be configured to extract computer file information using computer file metadata such as a file size, a file type, a file attribute, a file author, Portable Executable (PE) header information, a file name and/or the like. In other instances, computer file information can include contents of the computer file. The feature vector server 102 can be configured to use the computer file information to generate a feature vector associated with the computer file. Using the generated feature vector associated with the computer file, the feature vector server 102 can be configured to implement a triple-loss function neural network and/or a variational autoencoder and decoder neural network (as described above) to classify multiple computer file(s) into multiple classes and/or families.

For example, the feature vector server 102 can extract computer file information associated with a spreadsheet. The feature vector server 102 can then generate a feature vector associated with the spreadsheet based on the computer file information. The feature vector server 102 can implement a variational autoencoder neural network to generate a modified feature vector from the originally generated feature vector associated with the spreadsheet. The feature vector server 102 can then implement a decoder neural network to decode the modified feature vector. The decoder neural network can calculate and/or identify a distance between the modified feature vector and other feature vectors associated with classes (and/or families). Based on the calculated distances, the decoder neural network can classify the computer file into a certain class (and/or family). In some instances, the decoder neural network uses a nearest neighbor comparison method to classify the computer file into a certain class (and/or family). Multiple classes and/or families can be distinguished using multiple class labels, where each class label can be associated with one class. In some instances, the output of the decoder neural network can be a class label with which the computer file has been associated by the decoder neural network.

In some instances, the feature vector server 102 can be configured to identify and/or classify the computer file(s) based on their file types. For example, the feature vector server 102 can be configured to identify one or more documents, spreadsheets, presentations and/or the like. Using the generated feature vector associated with each of the documents, spreadsheets, presentations, and/or the like, the feature vector server 102 can be configured to implement the triple-loss function neural network and/or the variational autoencoder and decoder neural network (as described above) to classify multiple computer file(s) into multiple classes (and/or families). The multiple classes can be distinguished by different class labels such as 'Word File', 'Excel File', 'PowerPoint File' and/or the like. In some instances, the feature vector server 102 can perform classification of one or more computer file(s) using metadata such as file size, file type, file attribute, file author, Portable Executable (PE) header information, file name and/or the like.

In yet another instance, the feature vector server 102 can be configured to classify the one or more computer file(s) to identify an organization associated with the computer file, an individual associated with the computer file, a group associated with the computer file, an abnormality associated with the computer file, and/or the like. Moreover, in some instances, the feature vector server 102 can be configured to classify the one or more computer file(s) for file management purposes, file organization purposes, file operation purposes (for example, file camouflage, file copying, file conversion, file deletion), and/or the like.

For another example, the system and methods described herein can be used to identify and/or classify a user behavior. The user behavior can be associated with the user using a computer system connected to a communication network. The user behavior analysis can include the feature vector server 102 analyzing and/or monitoring a user's internet activity, a user's activity on an application stored on the computer system, a user accessing specific files and/or resources, a user's activity on an input device (such as maintaining a key log), and/or other user-related activities.

In some instances, the feature vector server 102 can be configured to analyze and/or monitor the user behavior. The feature vector server 102 can be configured to extract information associated with the user behavior. The feature vector server 102 can be configured to use the extracted information to generate a feature vector associated with the user behavior. Using the generated feature vector associated with the user behavior, the feature vector server 102 can be configured to implement a triple-loss function neural network and/or a variational autoencoder and decoder neural network (as described above) to classify multiple user behavior(s) into multiple classes and/or families.

For example, the feature vector server 102 can extract information associated with the user behavior (for example, the user's interaction with an application). The feature vector server 102 can then generate a feature vector associated with the user's interaction with the application based on the extracted information associated with the user behavior. The feature vector server 102 can implement a variational autoencoder neural network to generate a modified feature vector from the originally generated feature vector associated with the user's interaction with the application. The feature vector server 102 can then implement a decoder neural network to decode the modified feature vector. The decoder neural network can calculate and/or identify a distance between the modified feature vector and other feature vectors associated with classes (and/or families) of behavior. Based on the calculated distances, the decoder neural network can classify the user behavior into a certain class (and/or family). In some instances, the decoder neural network uses a nearest neighbor comparison method to classify the user behavior into a certain class (and/or family). Multiple classes and/or families can be distinguished using multiple class labels, where each class label can be associated with one class. In some instances, the output of the decoder neural network can be a class label under which the user behavior has been classified by the decoder neural network.

In some instances, the feature vector server 102 can be configured to analyze and/or classify the user behavior as a normal and/or an abnormal user behavior for the user, for a group and/or role associated with the user, for an organization, and/or the like. In some instances, the feature vector sever 102 can be configured to generalize the user behavior for identifying a pattern among a group of people working in a team.

In another example, the feature vector server 102 can be configured to analyze and/or classify the user behavior associated with online habits of the user (e.g., shopping habits of the user). The feature vector server 102 can be configured to generate a feature vector using demographic details of the user(s), details of the items selected, details of the items purchased, and/or the like. The feature vector server 102 can implement the neural network as described above. In some instances, the feature vector server 102 can be implemented by an online shopping website(s) for classifying the user behavior shopping pattern.

In yet another example, the feature vector server 102 can be implemented by an online media website for analyzing and/or classifying the behavior of a social media user. In some instances, the social media user behavior can be analyzed to generate a user behavior pattern. Based on the user behavior pattern, the feature vector server 102 can be configured to produce recommendations/selections, present relevant offers, display advertisements and/or the like.

For yet another example, the systems and methods described herein can be used to identify and/or classify one or more URLs. The URL can include references to a web page (http), a file transfer (ftp) site, an email (mailto), a database (Java Database Connectivity (JDBC)), a file path and/or the like.

In some instances, the feature vector server 102 can be configured to extract URL information by analyzing at least a portion of the URL, an IP address associated with the URL, a location associated with the URL, contents of a webpage associated with the URL, and/or the like. The feature vector server 102 can be configured to use the URL information to generate a feature vector associated with the URL. Using the generated feature vector associated with the URL, the feature vector server 102 can be configured to implement a triple-loss function neural network and/or a variational autoencoder and decoder neural network (as described above) to classify one and/or more URLs into multiple classes and/or families.

For example, the feature vector server 102 can be configured to identify the URL. The feature vector sever 102 can be configured to extract the URL information by analyzing at least a portion of the URL, an IP address associated with the URL, a location associated with the URL, contents of a webpage associated with the URL, and/or the like. The feature vector server 102 can then generate a feature vector associated with the URL based on the analyzed URL information. The feature vector server 102 can implement a variational autoencoder neural network to generate a modified feature vector from the originally generated feature vector associated with the URL. The feature vector server 102 can then implement a decoder neural network to decode the modified feature vector. The decoder neural network can calculate and/or identify a distance between the modified feature vector and other feature vectors associated with classes (and/or families). Based on the calculated distances, the decoder neural network can classify URL into a certain class (and/or family). In some instances, the decoder neural network uses a nearest neighbor comparison method to classify the URL into a certain class (and/or family). Multiple classes and/or families can be distinguished using multiple class labels, where each class label can be associated with one class. In some instances, the output of the decoder neural network can be a class label under which the URL has been classified by the decoder neural network.

For example, the feature vector server 102 can be configured to identify and/or analyze whether the URL is potentially malicious. In some instances, the feature vector server 102 can maintain a database of potentially malicious URLs for securing the computer system from a suspicious attack. The database of potentially malicious URLs can include URLs involved in performing activities such as phishing, domain forwarding and/or the like. Furthermore, the feature vector server 102 can be configured to provide a remedial measure for the identified malicious URL(s). The remedial measures can include the feature server vector 102 notifying the user regarding the identified URL. For example, the feature vector server 102 can be configured to instruct the client device (and/or other device) to quarantine and/or block the malicious URL(s), and/or the like.

In some instances, the feature vector server 102 can be configured to flag (and/or tag) the identified malicious URL. Furthermore, the feature vector server 102 can be configured share at least a portion of details of the malicious URL(s) to other computer devices connected to the communication network. In other implementations, the feature vector server 102 can classify the URL based on an author of a website associated with the URL, a host of a website associated with the URL, a type of website associated with the URL, a number of users associated with the URL, whether the URL is behaving normally and/or abnormally for that URL and/or for a type of URL with which that URL is associated, and/or the like.

For another example, the systems and methods described herein can be used to identify and/or classify a process(s) and/or an instance(s) of a computer program executed by a processor (for example, processor 104 as shown in FIG. 1). The process(s) and/or instance(s) executed by the processor 104 can include a child process, a parent process, a lightweight process, an orphan process, a zombie process and/or the like.

In some instances, the feature vector server 102 can be configured to extract process and/or instance information by analyzing the process(s) and/or instance(s) executed by the processor. The feature vector server 102 can be configured to use the process and/or instance information to generate a feature vector associated with the process(s) and/or instance(s). Such process and/or instance information can include a type of process, an execution time and/or duration associated with the process, an instantiator and/or parent of the process, a user device associated with the process, a source of the process, memory use associated with the process, processing time associated with the process, and/or the like. Using the generated feature vector associated with the process(s) and/or instance(s), the feature vector server 102 can be configured to implement a triple-loss function neural network and/or a variational autoencoder and decoder neural network (as described above) to classify one and/or more process(s) and/or instance(s) into multiple classes and/or families.

For example, the feature vector server 102 can be configured to identify the process(s) and/or instance(s). The feature vector sever 102 can be configured to extract the process and/or instance information by analyzing at least a portion of the process(s) and/or instance(s). The feature vector server 102 can then generate a feature vector associated with the process(s) and/or instance(s) based on the analyzed process and/or instance information. The feature vector server 102 can implement a variational autoencoder neural network to generate a modified feature vector from the originally generated feature vector associated with the process(s) and/or instance(s). The feature vector server 102 can then implement a decoder neural network to decode the modified feature vector. The decoder neural network can calculate and/or identify a distance between the modified feature vector and other feature vectors associated with classes (and/or families). Based on the calculated distances, the decoder neural network can classify the process(s) and/or instance(s) into a certain class (and/or family). In some instances, the decoder neural network uses a nearest neighbor comparison method to classify the process(s) and/or instance(s) into a certain class (and/or family). Multiple classes and/or families can be distinguished using multiple class labels, where each class label can be associated with one class. In some instances, the output of the decoder neural network can be a class label under which the process(s) and/or instance(s) has been classified by the decoder neural network.

In some instances, the multiple classes and/or families can be based on different details associated with the process(s) and/or instance(s). For example, some classes can be based on a time-related information (for example, run time, wait time, hold time, idle time of the processor (i.e. unused processor time capacity) and/or other process-related time), a process type information (for example, system process, application process and/or the like), a process execution related information (for example, process execution in a user space and/or in a kernel space), a system resource requirement related information, a process lifecycle related information and/or other process-related information. In some instances, the classes and/or families can be used to identify abnormal and/or normal operation of processes and/or instances. Specifically, the feature vector server 102 can classify a process as operating normally for that process, for a type of process associated with that process, for processes executing on a particular machine, for processes executing within a particular environment, and/or the like.

For example, the feature vector server 102 can be configured to analyze and/or monitor the time-related process information. The feature vector server 102 can be configured to generate feature vector using the information related to the time lapsed during the execution of the process(s) and/or instance(s) by the processor 104. Using the neural network (as described above), the feature vector server 102 can be configured to classify features vectors associated with the process(s) and/or instance(s) into multiple classes and/or families.

In some instances, the feature vector server 102 can be configured to provide some process(s) and/or instance(s) optimization capability to an operating system. In other instances, the feature vector server 102 can be configured to provide some security by identifying malicious process(s) and/or instance(s) and/or preventing the execution of the malicious process(s) and/or instance(s).

For yet another example, the systems and methods described herein can be used to identify and/or classify one or more device connected to a communication network. A device connected to the communication network can be a compute device such as a server, a computer, a smartphone, a tablet, a laptop, a desktop, a router, a switch, a hub and/or other computing device. The feature vector server 102 can be configured to identify one or more features of the device such as, for example, an identification address, data content accessed by the device (for example, upload data, download data, shared data and/or the like), a historic record associated with the device (for example, a record of device identified as malicious device, a datalog and/or the like), a device type (for example, a client device, a server and/or the like), an execution time of the device, a workload of the device, and/or other features associated with the device.

In some instances, the feature vector server 102 can be configured to extract device information by analyzing at least a portion of the device specification(s), characteristic(s) and/or feature(s). The feature vector server 102 can be configured to use the extracted device information to generate a feature vector associated with the device connected to the communication network. Using the generated feature vector associated with the device, the feature vector server 102 can be configured to implement a triple-loss function neural network and/or a variational autoencoder and decoder neural network (as described above) to classify one and/or more device(s) connected to the communication network into multiple classes and/or families.

For example, the feature vector server 102 can be configured to identify the device(s) connected to the communication network. The feature vector sever 102 can be configured to extract the device information by analyzing the device information. The feature vector server 102 can then generate a feature vector associated with the device based on the analyzed device information. The feature vector server 102 can implement a variational autoencoder neural network to generate a modified feature vector from the originally generated feature vector associated with the device connected to the communication network. The feature vector server 102 can then implement a decoder neural network to decode the modified feature vector. The decoder neural network can calculate and/or identify a distance between the modified feature vector and other feature vectors associated with classes (and/or families). Based on the calculated distances, the decoder neural network can classify the device connected to the communication network into a certain class (and/or family). In some instances, the decoder neural network uses a nearest neighbor comparison method to classify the device into a certain class (and/or family). Multiple classes and/or families can be distinguished using multiple class labels, where each class label can be associated with one class. In some instances, the output of the decoder neural network can be a class label with which the device has been associated by the decoder neural network.

In some instances, the feature vector server 102 can be configured to identify and classify the device(s) connected to the communication network by analyzing the identification address(es) of the device such as a physical address (Media Access Control (MAC) address), a logical address (Internet Protocol (IP) address) and/or the like. In some instances, the feature vector server 102 can be configured to analyze and/or monitor at least a portion of content accessed by the device, for example, the data downloaded and/or uploaded by the device connected to a communication network. Moreover, the feature vector server 102 can be configured to analyze and/or monitor the device to determine whether the device is allowed to access and/or share at least a portion of content. In other instances, the feature vector server 102 can monitor behavior of the device and identify whether the behavior is normal and/or abnormal for that device, for a group of devices associated with that device and/or the like.

Furthermore, the feature vector server 102 can provide remedial actions if the identified device's actions are determined to be abnormal. The feature vector server 102 can implement remedial actions such as holding and/or quarantining an identified potentially malicious content, limiting and/or restricting the access of the device to the communication network, banning and/or removing the device from the communication network, notifying the communication network administrator and/or the like. In other instances, the feature vector server 102 can provide remedial actions if the identified device(s) is trying to share and/or access restricted data content.

In some instances, the feature vector server 102 can be configured to analyze and/or monitor user account information linked to the device connected to the communication network. For example, the feature vector server 102 can be configured to extract the user account information (such as login credentials, username, age, sex and/or the like) for generating feature vector associated with the user account. Using the generated feature vector associated with the user account linked to the device, the feature vector server 102 can be configured to implement a triple-loss function neural network and/or a variational autoencoder and decoder neural network (as described above) to classify one and/or more user accounts connected to the communication network into multiple classes and/or families.

Additionally, while methods and apparatuses descried above use a deep neural network threat model, methods and apparatuses described herein may be used with any data modeling and/or machine learning algorithm and/or model, including but not limited to decision tree models, Bayesian networks, clustering models, and/or similar algorithms and/or models.

It is intended that the systems and methods described herein can be performed by software (stored in memory and/or executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including Unix utilities, C, C++, Java™, Ruby, SQL, SAS®, the R programming language/software environment, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code. Each of the devices described herein can include one or more processors as described above.

Some embodiments described herein relate to devices with a non-transitory computer-readable medium (also can be referred to as a non-transitory processor-readable medium or memory) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

While various embodiments have been described above, it should be understood that they have been presented by way of example only, and not limitation. Where methods and steps described above indicate certain events occurring in certain order, the ordering of certain steps may be modified. Additionally, certain of the steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein. Furthermore, although various embodiments are described as having a particular entity associated with a particular compute device, in other embodiments different entities can be associated with other and/or different compute devices.

What is claimed is:

1. An apparatus, comprising:
   a memory; and
   a processor operatively coupled to the memory, the processor configured to:
   identify a feature vector for a potentially malicious file;
   provide the feature vector as an input to a trained neural network encoder to produce a modified feature vector that more closely resembles an identified collection of feature vectors associated with a classification of maliciousness than the feature vector, the modified feature vector being produced based on the classification of maliciousness that was learned by the trained neural network encoder;
   generate an output vector by introducing Gaussian noise into the modified feature vector, the Gaussian noise ensuring a Gaussian distribution for the output vector within a set of modified feature vectors;
   providing the output vector as an input to a trained neural network decoder associated with the trained neural network encoder to produce as an output an identifier of a class, the set of modified feature vectors being associated with the class; and
   performing a remedial action on the potentially malicious file based on the potentially malicious file being associated with the class.

2. The apparatus of claim 1, wherein the trained neural network decoder is configured to identify that a distance between the output vector and the set of modified feature vectors from a plurality of sets of modified feature vectors is less than a distance between the output vector and each remaining set of modified feature vectors from the plurality of sets of modified feature vectors.

3. The apparatus of claim 1, wherein the processor is configured to identify the feature vector for the potentially malicious file by extracting characteristics from the potentially malicious file.

4. A method, comprising:
   training a triple-loss function neural network by providing an anchor feature vector associated with a first class, a training feature vector associated with the first class, and a training feature vector associated with a second class different from the first class;
   identifying a feature vector for an artifact;
   providing the feature vector for the artifact as an input to the triple-loss function neural network to produce a modified feature vector that more closely resembles an identified plurality of feature vectors associated with a classification of maliciousness than the feature vector, the modified feature vector being produced based on the classification of maliciousness that was learned by the triple-loss function neural network;
   classifying the artifact as associated with a class of artifacts associated with the classification of maliciousness based on a distance between the modified feature vector and a set of modified feature vectors from a plurality of sets of modified feature vectors being less than a distance between the modified feature vector and each remaining set of modified feature vectors from the plurality of sets of modified feature vectors, the set of modified feature vectors being associated with the class of artifacts; and
   performing an action associated with the artifact based on the artifact being classified as associated with the class of artifacts associated with the classification of maliciousness.

5. The method of claim 4, wherein the identifying the feature vector includes identifying the feature vector for a potentially malicious file by extracting characteristics from the artifact.

6. The method of claim 4, wherein the distance between the modified feature vector and the set of modified feature vectors from the plurality of sets of modified feature vectors is at least one of a Euclidean distance or a Hamming distance.

7. The method of claim 4, wherein the artifact is a potentially malicious file and the class of artifacts is a class of malware, and the performing the action associated with the artifact includes quarantining the potentially malicious file.

8. A non-transitory processor-readable medium storing code representing instructions to be executed by a processor, the code comprising code to cause the processor to:
   identify a feature vector for an artifact;
   provide the feature vector as an input to a machine learning model to produce a modified feature vector, the modified feature vector being configured to more closely resemble an identified collection of feature vectors associated with a classification of artifacts than the feature vector, the modified feature vector being produced based on the classification of artifacts that was learned during a training of the machine learning model;
   classify the artifact as associated with a class of artifacts based on a distance between the modified feature vector and a set of modified feature vectors from a plurality of sets of modified feature vectors being less than a distance between the modified feature vector and each remaining set of modified feature vectors from the plurality of sets of modified feature vectors, the set of modified feature vectors being associated with the class of artifacts; and
   perform an action associated with the artifact based on the artifact being classified as associated with the class of artifacts.

9. The non-transitory processor-readable medium of claim 8, wherein the machine learning model is a trained neural network encoder, the code to cause the processor to classify the artifact includes code to cause the processor to classify the artifact by providing the modified feature vector to a trained neural network decoder that produces as an output an identifier of the class of artifacts.

10. The non-transitory processor-readable medium of claim 8, wherein the code to cause the processor to classify the artifact includes code to cause the processor to calculate a distance between the modified feature vector and each set of modified feature vectors from the plurality of sets of modified feature vectors.

11. The non-transitory processor-readable medium of claim 8, wherein the machine learning model is a trained triple-loss function neural network.

12. The non-transitory processor-readable medium of claim 8, wherein the code to cause the processor to classify the artifact is further configured to cause the processor to:
   introduce Gaussian noise into the modified feature vector prior to classifying the artifact as associated with the class of artifacts to ensure a Gaussian distribution for the set of modified feature vectors associated with the class of artifacts.

13. The non-transitory processor-readable medium of claim 8, wherein the artifact is a potentially malicious file and the class of artifacts is a class of malware, the code to cause the processor to perform the action associated with the artifact includes code to cause the processor to quarantine the potentially malicious file.

14. The non-transitory processor-readable medium of claim 8, wherein the distance between the modified feature vector and the set of modified feature vectors from the plurality of sets of modified feature vectors is at least one of a Euclidean distance or a Hamming distance.

* * * * *